W. M. MYERS.
PRESSURE INDICATOR FOR PNEUMATIC TIRES.
APPLICATION FILED MAY 22, 1916.
1,370,988.
Patented Mar. 8, 1921.
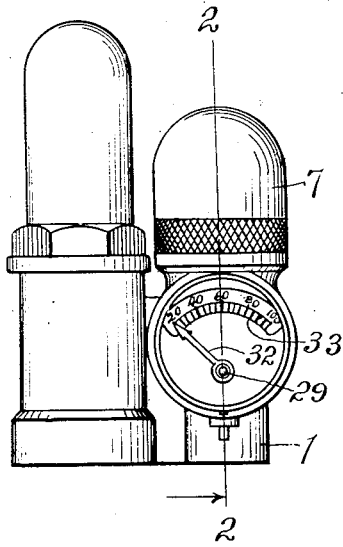
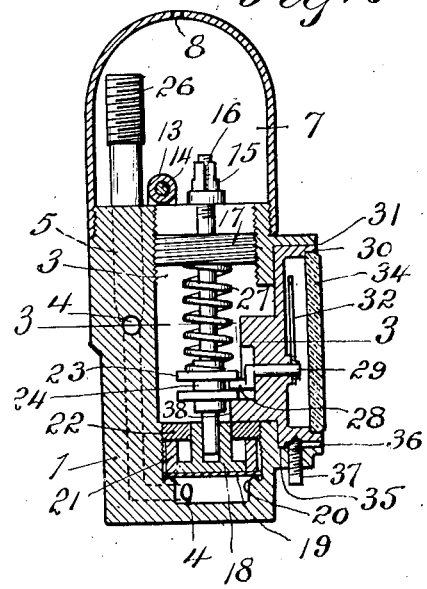
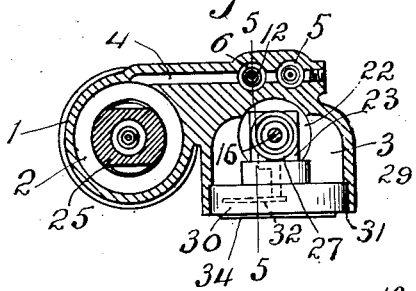
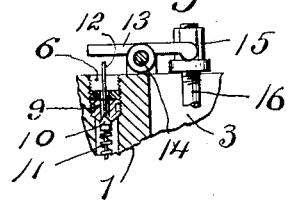
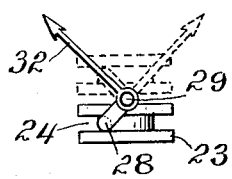
WITNESS:
R. E. Hamilton
INVENTOR.
William M. Myers
BY Warren L. House
His ATTORNEY

UNITED STATES PATENT OFFICE.

WILLIAM M. MYERS, OF ST. JOSEPH, MISSOURI.

PRESSURE-INDICATOR FOR PNEUMATIC TIRES.

1,370,988.  Specification of Letters Patent.  Patented Mar. 8, 1921.

Application filed May 22, 1916. Serial No. 99,210.

*To all whom it may concern:*

Be it known that I, WILLIAM M. MYERS, a citizen of the United States, residing at St. Joseph, in the county of Jackson and State of Missouri, have invented certain new and useful Improvements in Pressure-Indicators for Pneumatic Tires, of which the following is a specification.

My invention relates to improvements in pressure indicators. It is particularly well adapted for use in indicators adapted to be applied to automobile pneumatic tires.

The object of my invention is to provide an indicator by which the internal pressure of a tire will be reliably and accurately ascertainable at a glance.

Another object of my invention is to provide a pressure indicator which may be cheaply manufactured, which may be quickly adjusted, which is durable and not liable to get out of repair, and which may be easily and quickly assembled and affixed to a tire.

The novel features of my invention are hereinafter fully described and claimed.

In the accompanying drawing, which illustrates the preferred embodiment of my invention, Figure 1 is a side elevation of my improved indicator.

Fig. 2 is an enlarged vertical section on the line 2—2 of Fig. 1.

Fig. 3 is a cross section, reduced, on the line 3—3 of Fig. 2, the dial member being shown in plan.

Fig. 4 is a front elevation, enlarged, of the indicating hand or pointer, the crank shaft supporting the same, and the collar for operating the crank shaft.

Fig. 5 is a vertical sectional view, enlarged, on the line 5—5 of Fig. 3.

Similar reference characters designate similar parts in the different views.

1 designates a casing adapted to be secured to the filling tube of a pneumatic tire, and provided with two chambers 2 and 3 connected with each other by an air passage 4 having two branches 5 and 6 which are adapted to communicate with the interior of a cap 7 having screw-threaded connection with the casing 1 and provided with an opening 8 leading to the atmosphere.

The passage 6 is screw-threaded at its upper end and has mounted therein a valve seat 9 against which is adapted to bear a valve 10, which is normally held closed by a coil spring 11 having a suitable bearing for its lower end, not shown. The valve 10 is provided with an upwardly extending stem 12 adapted to be depressed, so as to open the valve 10 by a lever 13 having a bearing 14 mounted on the casing 1. The lever 13 at the other side of the bearing 14 is adapted to be swung, so as to force the valve 10 downwardly to the open position and against the pressure of the spring 11, by means of a nut 15 mounted on the screw-threaded upper end of a vertical plunger 16 which is vertically slidable in an externally screw-threaded plug 17 mounted in the screw-threaded upper end of the chamber 3.

The lower end of the plunger 16 is slidably mounted in a piston 18 which bears against the upper side of a flexible diaphragm 19 which is held clamped adjacent to its edges upon an annular seat 20 by a vertical tube 21 in which the piston 18 is slidable against the upper end of which bears the under side of a screw-threaded ring 22 mounted in a threaded portion of the casing 1 and having the piston 18 vertically slidable therein. The ring 22 is below and of smaller diameter than the plug 17, so that it may be readily inserted and screwed into place.

Preferably, the plunger 16 comprises a cylindrical rod having rigidly secured thereto a rectangular collar 23, Fig. 3, provided with a horizontal peripheral groove 24, Fig. 2, the function of which is hereinafter described.

The air from the tire, not shown, enters the chamber 2 through the filling tube 25, Fig. 3, which is of the ordinary type, and is normally retained in open communication with the chamber 2 by means of mechanism not pertinent to this invention.

The passage 5 has mounted in it a filling tube 26, Fig. 2, which contains the usual valve mechanism for preventing the escape of air therefrom.

The tire, not shown, is filled by pumping air into the tube 26, the cap 7 being removed for this purpose.

The air pumped into the tube 26 passes by way of the branch 5 into the passage 4, thence into the chamber 2, and thence through the filling tube 25 into the tire. The pressure of the air in the tire is always the same as that in the passage 4 and chamber 2, and this pressure entering the chamber 3, by the passage 4, below the diaphragm 19, forces upwardly the latter and the piston 18, and through said piston the plunger 16, the upward movement of which is resisted by means of a coil spring 27, Fig. 2, the resistance offered by the spring being adjustably determined by the plug 17 against which the upper end of the spring 27 bears, the lower end thereof having a bearing against the collar 23.

In the groove 24 of the collar 23 is mounted a crank arm 28 at the inner end of a horizontal crank shaft 29 which is oscillatively mounted in a member 30 which is preferably circular and mounted in a circular hole 31 and bearing against a seat provided in one side of the casing 1.

Secured to the outer end of the shaft 29 is a pointer or hand 32 which is adapted to indicate graduations, 33 designating pounds pressure, and provided on the forward side of the member 30, the outer face of which serves as a die.

Mounted in the member 30 forward of the hand or pointer 32 is a glass disk 34.

In order that the circular member 30 may be properly positioned in the circular opening 31, the lower side of the member 30 is provided with a projection 35, Fig. 2, which is slidable into a horizontal groove 36 provided in the casing 1.

For retaining the member 30 in the casing 1, the latter has mounted in it a set screw 37, Fig. 2, having a pointed upper end adapted to enter a corresponding recess in the lower side of the member 30.

As the pressure in the tire and in the chamber 2 and chamber 3, below the diaphragm 19, rises, the plunger 16 will be forced upwardly, against the pressure of the spring 27, by means of the diaphragm 19 and piston 18, until the maximum pressure desired in the tire is reached, at which time the nut 15 will swing the lever 13, so that the latter will come against and depress the stem 12, thereby opening the valve 10 and permitting air to escape through the passage 6 into the atmosphere. When the pressure falls below the pre-determined amount, the spring 27 will force the plunger 16 downwardly, thus permitting the spring 11 to close the valve 10.

As the plunger 16 moves upwardly, its collar 23 will swing the crank arm 28 so as to move the hand or pointer 32 from the position shown in solid lines in Fig. 4, toward the position indicated in dotted lines in said figure. The pointer 32 will thus indicate on the dial the amount of pressure in the tire.

The member 30 on its inner side and lower end is provided with a projection 38, Fig. 2, against which the collar 23 strikes and which serves as a stop which limits the downward movement of the plunger. The collar and projection 38 are so disposed relative to each other and to the crank 28 that the hand or pointer 32 will indicate the left hand graduation of the dial, as viewed in Fig. 1, when the plunger reaches its lowermost position.

It is desirable that the limitation of downward movement of the plunger 16 be effected by the member 30, as this member contains the rock shaft which carries the hand or pointer 32.

The collar 23 also serves another function, which is to prevent axial rotation of the plunger 16, when the nut 15 is turned thereon to effect its adjustment relative to the lever 13. In order to effect this function, the adjacent flat edge of the collar 23, Fig. 3, is adapted to slide against the flat rear side of the member 30. The collar 23 thus serves the function of swinging the rock shaft 29 and of holding the plunger from turning.

After the parts have been assembled as described, the device is regulated as follows:

The cap 7 is removed and the casing 1 is attached to the filling tube of a tire, following which the tire is inflated through the tube 26 to a pressure above the maximum desired. A pressure gage is then attached to the tube 26, and the screw plug 17 turned until the hand or pointer 32 indicates on the dial a pressure corresponding to that indicated by the pressure gage. This adjustment will be permanent.

The nut 15 is then screwed upwardly until it forces the lever 13 against the stem 12 and so as to open the valve 10, thus permitting air to escape through the passage 6 to the atmosphere. Such upward adjustment of the nut 15 is continued until the indicator hand or pointer 32 indicates a pressure which is the maximum desired to be retained in the tire. Adjustment of the nut 15 is then discontinued, the pressure gage removed from the tube 26, and the cap 7 applied to the casing 1. If the pressure should rise to a point above the pre-determined maximum, the plunger 16 and nut 15 will be forced upwardly, thereby swinging the lever 13 so as to open the valve 10, which will close when the pressure is reduced to the pre-determined maximum.

I do not limit my invention to the structure shown and described, as modifications, within the scope of the appended claims, may be made without departing from the spirit of my invention.

What I claim is:—

1. In pressure indicators, a casing, a member mounted therein and having means engaging therewith for being properly positioned thereon and having a projection, indicating means mounted in said member, and movable means for actuating said indicating means adapted to directly engage said projection and having its movement in one direction limited by said projection, the projection being in the path of the movable means.

2. In pressure indicators, a casing, a screw-threaded plunger reciprocative therein, a nut on the threaded part of the plunger, a valve operating member engaging and movable in one direction by said nut, indicating means, a guiding member mounted on said casing having guiding means engaging the plunger arranged to hold the latter from axial turning, and means actuated by the plunger and supported by said guiding member for operating the indicating means, substantially as set forth.

3. In pressure indicators, a casing, a screw-threaded plunger reciprocative therein, a nut on the threaded part of the plunger, a valve operating member engaging and movable in one direction by said nut, indicating means, a guiding member mounted on said casing having guiding means engaging the plunger arranged to hold the latter from axial turning, the guiding member limiting the movement of the plunger in one direction, and means actuated by the plunger and supported by the guiding member for operating the indicating means, substantially as set forth.

In testimony whereof I have signed my name to this specification.

WILLIAM M. MYERS.